Dec. 11, 1956   C. B. DE VLIEG ET AL   2,773,432
MACHINE FOR FORMING PREDETERMINED IRREGULAR SURFACES

Original Filed May 15, 1947   4 Sheets-Sheet 1

Inventors
Charles B. DeVlieg
Howard R. DeVlieg
Charles R. DeVlieg

By

Attys

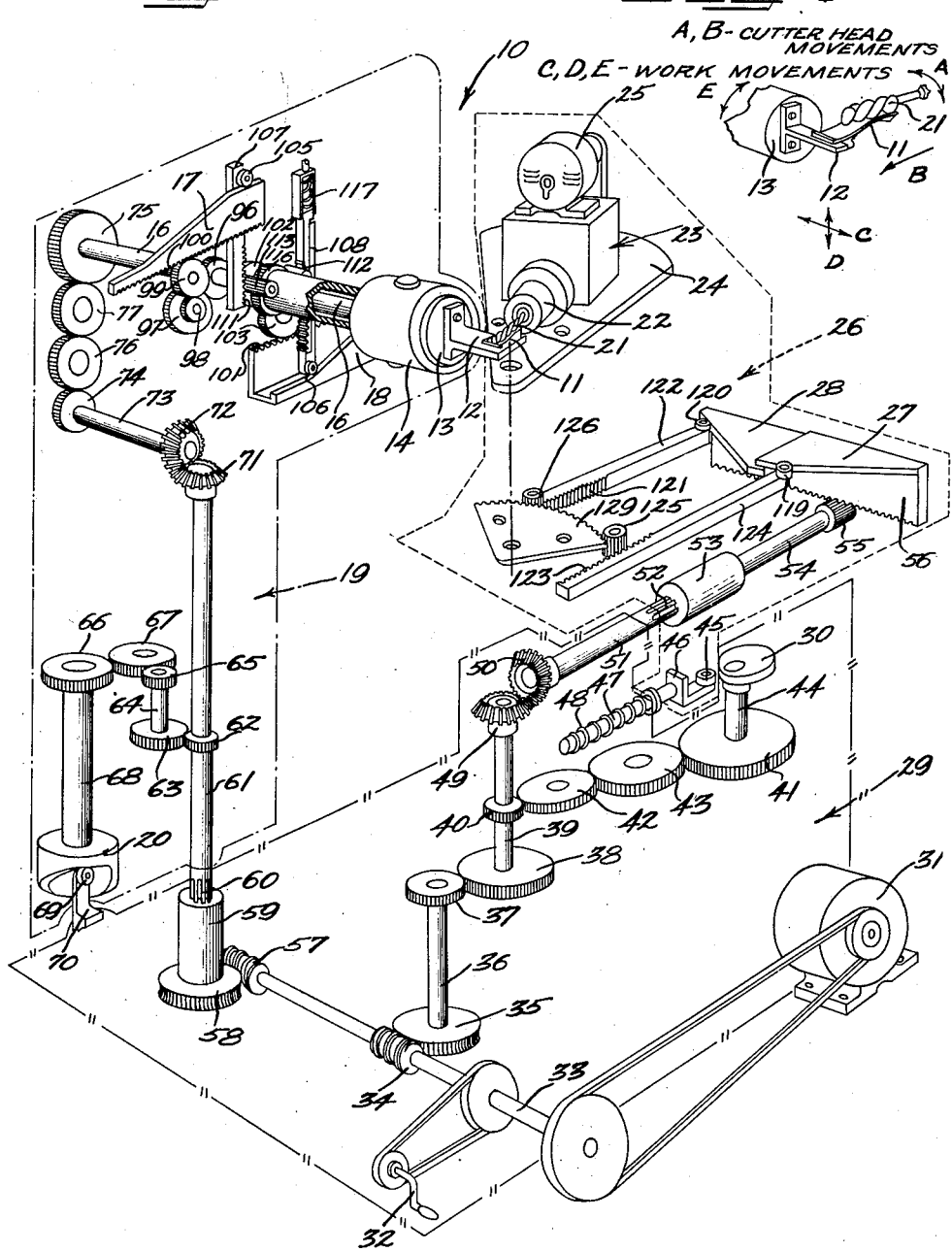

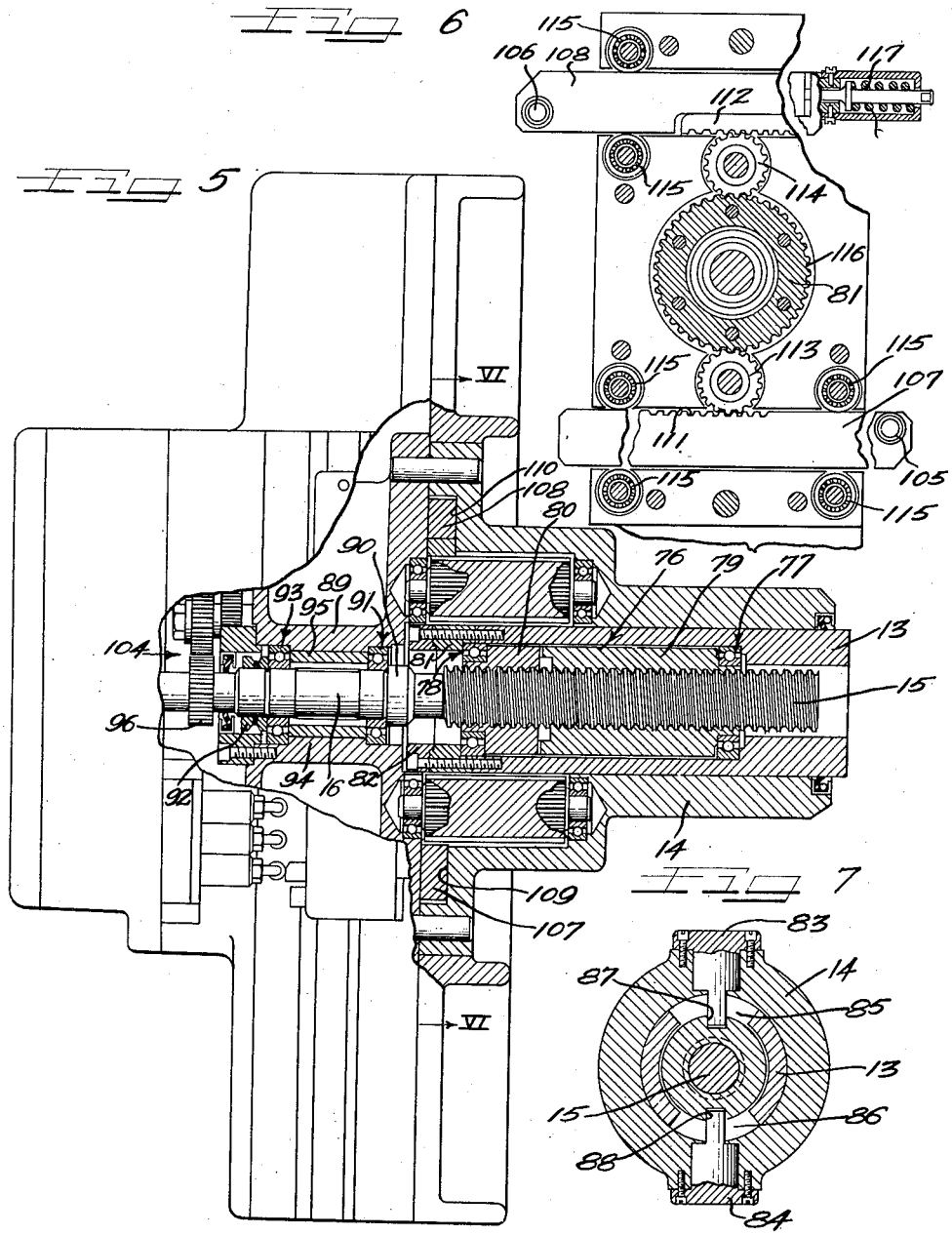

Dec. 11, 1956     C. B. DE VLIEG ET AL     2,773,432
MACHINE FOR FORMING PREDETERMINED IRREGULAR SURFACES

Original Filed May 15, 1947     4 Sheets-Sheet 4

Inventors
Charles B. DeVlieg
Howard R. DeVlieg
Charles R. DeVlieg
By Attys

United States Patent Office 2,773,432
Patented Dec. 11, 1956

2,773,432

MACHINE FOR FORMING PREDETERMINED IRREGULAR SURFACES

Charles B. De Vlieg, Farmington, Howard R. De Vlieg, Grosse Pointe Woods, and Charles R. De Vlieg, Birmingham, Mich., assignors to Thompson Products, Inc., Cleveland, Ohio, a corporation of Ohio Original application May 15, 1947, Serial No. 748,282, now Patent No. 2,660,930, dated December 1, 1953. Divided and this application October 9, 1953, Serial No. 385,099

8 Claims. (Cl. 90—22)

This invention relates to a metal working machine in which relative rotative and rectilinear movements of a cutter and a work piece are automatically controlled with each movement being according to a predetermined function of every other movement and is particularly concerned with mechanism for accurately effecting such movements.

This application is a division of our copending application entitled "Machine For Forming Predetermined Irregular Surfaces," filed May 15, 1947, United States Serial No. 748,282, now United States Letters Patent No. 2,660,930, issued December 1, 1953.

An object of this invention is to provide improved mechanism for controlling movements in a milling machine or the like.

A more specific object of this invention is to provide improved mechanisms for controlling movements in a milling machine or the like with backlash prevented.

Other objects, and the features and advantages of the present invention will become more fully apparent from the following detailed description taken in conjunction with the accompanying drawings which illustrate preferred embodiments and in which:

Figure 3 is a schematic diagram in perspective showing the mechanisms for effective motions of the various parts of the milling machine of Figure 1;

Figure 4 is a fragmentary diagrammatic view illustrating the relative movement of the work piece and cutter in the machine of Figure 1;

Figure 5 is an enlarged fragmentary horizontal sectional view through the work holder spindle of the machine of Figure 1, taken substantially along the axis of the spindle;

Figure 6 is a sectional view taken substantially along line VI—VI of Figure 5;

Figure 7 is a transverse sectional view taken substantially along line VII—VII of Figure 1.

Figure 1:
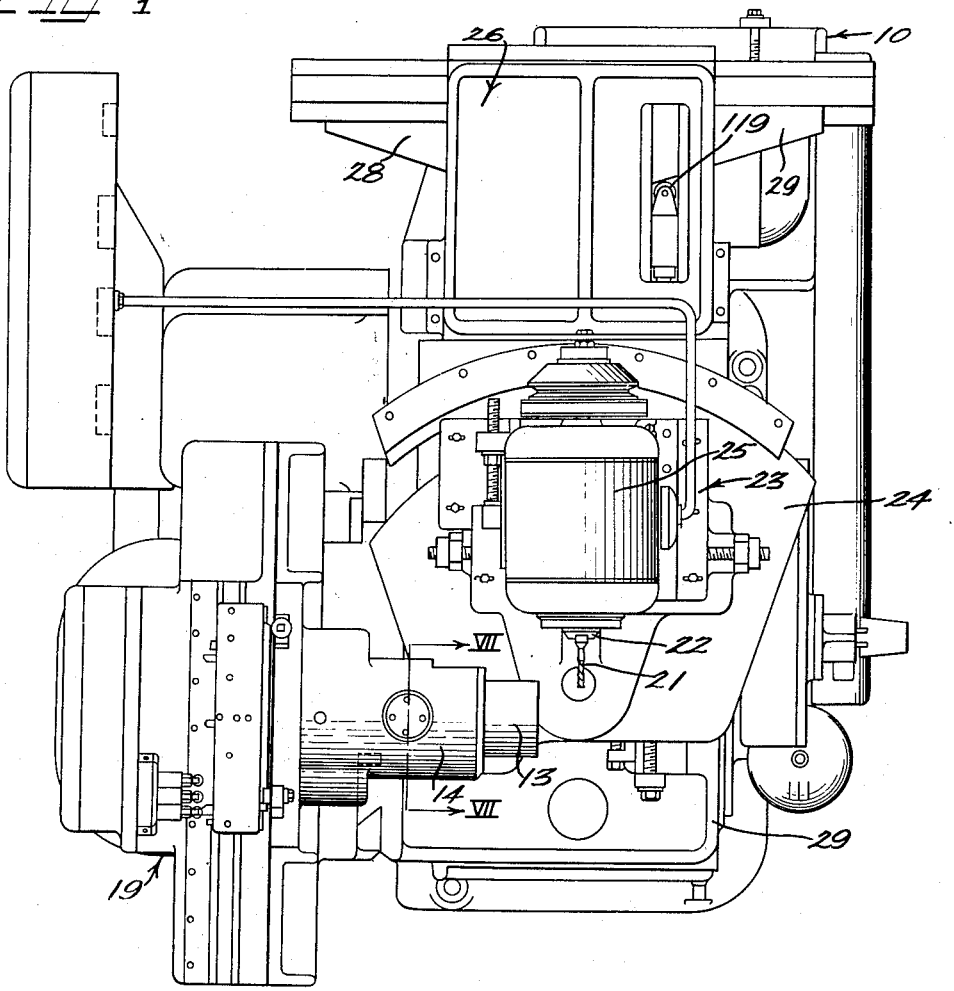
Figure 1 is a top plan view of a milling machine constructed in accordance with the principles of the present invention.

Reference numeral 10 generally designates a machine constructed according to the principles of this invention which is particularly useful in forming turbine blades such as those used in superchargers, jet engines and the like although it is useful in forming many other different types of articles.

Referring to Figures 3 and 4, a work piece 11 may be supported by a fixture 12 which is secured to a work holder spindle 13 journaled for rotation within a housing 14 and movable rectilinearly in the direction of its horizontal axis. This rectilinear horizontal movement is achieved through a lead screw 15 (Figure 2) disposed at the end of a shaft 16. The work fixture 12 may be rotated about the axis of the spindle 13 according to a predetermined function of the horizontal rectilinear movement of the work piece 11 under the control of cams 17 and 18 through mechanism which forms an important feature of the present invention and which will be described in detail hereinafter.

The housing 14, which journals the work-support spindle 13, is affixed in a work head 19 which is movable bodily or rectilinearly in a vertical direction under the control of a cam 20, the cam 20 being driven in synchronism with the shaft 16 so that this vertical movement may be according to a predetermined function of the horizontal rectilinear movement of the work fixture 12 relative to the housing 14.

A milling cutter 21 is carried by a cutter spindle 22 journaled for rotation on a horizontal axis in a cutter head 23 which is supported by a table 24. A motor 25 may be provided for driving the cutter spindle 22. Table 24 is supported for movement about a vertical axis on a carriage 26, this angular movement being effected according to a predetermined function of the horizontal movement of the work fixture 12 under the control of cams 27 and 28 through mechanism forming an important feature of the present invention and which will be described in detail hereinafter.

The carriage 26 is supported on a base 29 which movement may be controlled by a cam 30.

As pointed out above, this application is a division of our copending application entitled "Machine For Forming Predetermined Irregular Surfaces," filed May 15, 1947, United States Serial No. 748,282, now United States Letters Patent No. 2,660,930, issued December 1, 1953 and this application is concerned primarily with the mechanisms for effecting axial and angular movement of the work holder spindle 13 and angular movement of the cutter head support table 24.

Before proceeding with a detailed description of such mechanisms, however, the drive of the various mechanisms of the machine may be briefly described.

Referring particularly to Figure 3, either a motor 31 or a hand crank 32 may be used to drive a drive shaft 33 through suitable V-belt connections. The drive shaft 33 carries a first worm gear 34 meshing with a gear 35 on a shaft 36 which carries a second gear 37 in mesh with a gear 38 on a shaft 39. The shaft 39 carries a gear 40 which drives a gear 41 through intermediate gears 42 and 43, the gear 41 being affixed to a shaft 44 with the cam 30 also affixed to the shaft 44.

As pointed out above, the cam 30 controls horizontal movement of the carriage 26, which may be achieved by means of a cam follower in the form of a roller 45 suitably journaled in an adjustable bracket 46 bolted to the carriage 26. Opposing the motion of the carriage 26 as effected by the cam 30 is a bolt 47 carried by the base 29 and having a head portion urged toward the bracket 46 by a compression spring 48.

The shaft 39 also carries a bevel gear 49 in mesh with a bevel gear 50 mounted at one end of a shaft 51, the opposite end of the shaft 51 being formed with a splined surface 52. Slidably connected to the splined end of the shaft 51 is a sleeve 53 having internal grooves shaped to interfit with the splined surface 52 on the shaft 51. The sleeve 53 is rigidly connected to one end of a horizontally extending shaft 54 journaled in the carriage 26. This spline connection between the shafts 51 and 54, of course, permits transmission of driving force between the shafts while allowing horizontal movement of the carriage 26 relative to the base 29.

The shaft 54 carries a pinion gear 55 which meshes with a rack 56 which carries the cams 27 and 28.

Thus the cams 27 and 28 may effect angular movement of the cutter head support table 24 as a predetermined function of the rotation of the main shaft 33 and the horizontal rectilinear movement of the carriage 26 by the cam 30. The mechanism for achieving this angular movement of the cutter head support table 24 will be described in detail hereinafter.

The main drive shaft 33 also carries a second worm gear meshing with a gear 58 which carries a vertically extending sleeve 59 having internal axially extending grooves interfitting with the splined surface 60 at the lower end of a shaft 61 journaled in the work head 19, this spline connection, of course, permitting drive of the shaft 61 while allowing vertical movement of the work head 19.

The shaft 61 carried a pinion gear 62 meshed with a gear 63 on a shaft 64 which carries a pinion gear 65 meshed with a gear 66 through an intermediate gear 67. The gear 66 is affixed to the upper end of a shaft 68 which carries the cam 20 at its lower end.

As described above, the cam 20 effects vertical movement of the work head 19 which may be achieved through a follower 69 in the form of a roller journaled on a bracket 70 affixed to the main base 29 of the machine.

The vertical shaft 61 also carries a bevel gear 71 meshed with a bevel gear 72 on a horizontal shaft 73 which carries a gear 74 meshed with a gear 75 through intermediate gears 76 and 77. The gear 75 is affixed to the end of the shaft 16 which, as described, effects axial and angular movement of the work holder spindle 13 through mechanism forming an important feature of the present invention.

Figure 2:
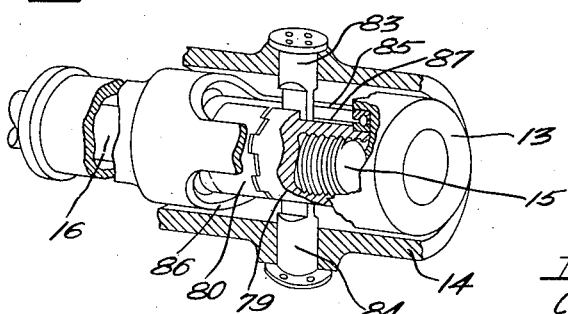
Figure 2 is an enlarged fragmentary perspective view showing details of a work holder spindle utilized in the machine of Figure 1.

Referring to Figures 2, 5 and 7, the lead screw 15 at the end of the shaft 16 is arranged for effecting axial movement of the work support spindle 13 and for this purpose the lead screw 15 is threaded into an anti-backlash nut 76 disposed in concentric relation on the interior of the spindle 13. The nut is held against axial displacement relative to the spindle 13 and against rotational displacement relative to the housing 14 so that rotation of the lead screw 15 will effect axial movement of the spindle 13.

At opposite ends of the nut 76 suitable bearings 77 and 78 are provided for permitting rotational movement of the spindle 13 about its axis. The nut 76 is formed in two parts 79 and 80 in axial alignment and joined together by an inter-locking tongue and groove formation on the respective leading edges of the parts. The part 79 abuts against the bearing 77 on the interior of the spindle 13 so that the threads on the part 79 positively engage one side of the threads on the other portion of the lead screw 15. The part 80 is arranged so that the threads formed thereon positively engage the opposite side of the threads on the inner portion of the lead screw 15.

To this end a washer 81, dimensioned to the correct axial length, abuts against the bearing 78 which in turn abuts against the part 80 to position the latter. The washer 81 is positioned by an annular flange or cap 82 bolted or otherwise suitably secured to the spindle 13.

The nut 76 is held against rotation relative to the housing 14 by diametrically opposed pins 83 and 84 which extend through the walls of the housing 14 and enlarged openings 85 and 86, respectively, in the walls of the spindle 13 and slidably fit in elongated axially extending slots 87 and 88, respectively, formed in both of the parts 79 and 80 of the nut 76.

From the foregoing it will be seen that the nut 76 is held against rotational movement and that the threads on the parts 79 and 80 thereof positively engage the threads of the lead screw 15 at all times so that there will be no lost motion between the respective components of the machine when the direction of rotation of the lead screw 15 is reversed.

As described above, the lead screw 15 may be formed on the end of the shaft 16 which is suitably journaled in a bracket 89 affixed to the housing 14. For this purpose, the shaft 16 may have an integral shoulder portion 90 arranged to abut a bearing 91 and a lock nut 92 may be threaded on the shaft 16 and be arranged to abut a bearing 93, an inwardly projecting portion 94 of the bracket 89 and the sleeve 95 being disposed between the bearings 91 and 93 to limit axial movement of the bearings.

As briefly described above, the spindle 13 is rotated according to a predetermined function of the axial movement thereof by mechanism including the cams 17 and 18. To simplify the construction, these cams 17 and 18 are actuated from the same shaft 16 which drives the lead screw 15 effecting axial movement of the work holder spindle 13.

As best shown in Figure 3, the power take-off from the shaft 16 is in the form of two sets of similar gear trains engaging opposite sides of the shaft. One such gear train comprises a pinion gear 96 on the shaft 16 meshing with a spur gear 97 which is directly connected to a pinion gear 98 which in turn meshes with a spur gear 99. This gear 99 meshes with a rack 100 formed on the cam 17. The other gear train, similar to that just described, operates between the gear 96 and a rack 101 on the cam 18, only the first gear 102 and the last gear 103 of this gear train being shown in Figure 3. These gear trains may be suitably journaled in a compartment 104 (Figure 5).

The cams 17 and 18 may be arranged in spaced parallel relation on slides for rectilinear movement in opposite directions under the drive of the gear trains above described.

Associated with the cams 17 and 18 are cam followers in the form of rollers 105 and 106 supported respectively on the upper and lower ends of elongated bars 107 and 108 slidably disposed in vertically extending ways 109 and 110 in the housing 14 (Figures 5 and 6).

At the end of each bar 107 and 108 opposite the respective rollers 105 and 106 are racks 111 and 112, respectively, which mesh with elongated pinions 113 and 114 on opposite sides of the spindle 13. Rollers 115 are engaged with opposite sides of each of the bars 107 and 108 to guide the latter in rectilinear movement in opposite directions and to insure engagement of the racks 111 and 112 with the pinions 113 and 114. Suitable bearing supports are, of course, provided for each of the pinion gears 113 and 114. These gears are arranged to simultaneously mesh with a spur gear 116 formed on the outside of the washer 81 which, as described above, is positioned by the annular flange or cap 82 bolted to the spindle 13. The width of each pinion gear 113 and 114 is several times that of the spur gear 116 so as to permit continued meshing of the respective gears as the spindle 13 is moved horizontally by the lead screw 15.

Means are provided for preventing backlash in the respective parts described above upon reversal of direction of the movement thereof. To this end the rack 112 is supported on the bar 108 for longitudinal movement relative thereto. As shown in Figure 6, a spring 117 is interposed between the rack 112 and the bar 108 and urges the rack 112 relative to the bar 108 in a direction such that the teeth of the rack are positively engaged with the teeth of the pinion 114 and the roller 106 is positively engaged with the cam 18. Thus it will be apparent that there will be no lost motion between the component parts during a reversal of movement of such parts and yet there are no extreme pressures applied to the parts so that actuation may be performed with a minimum of force and without undue wear on the parts.

Figure 8:
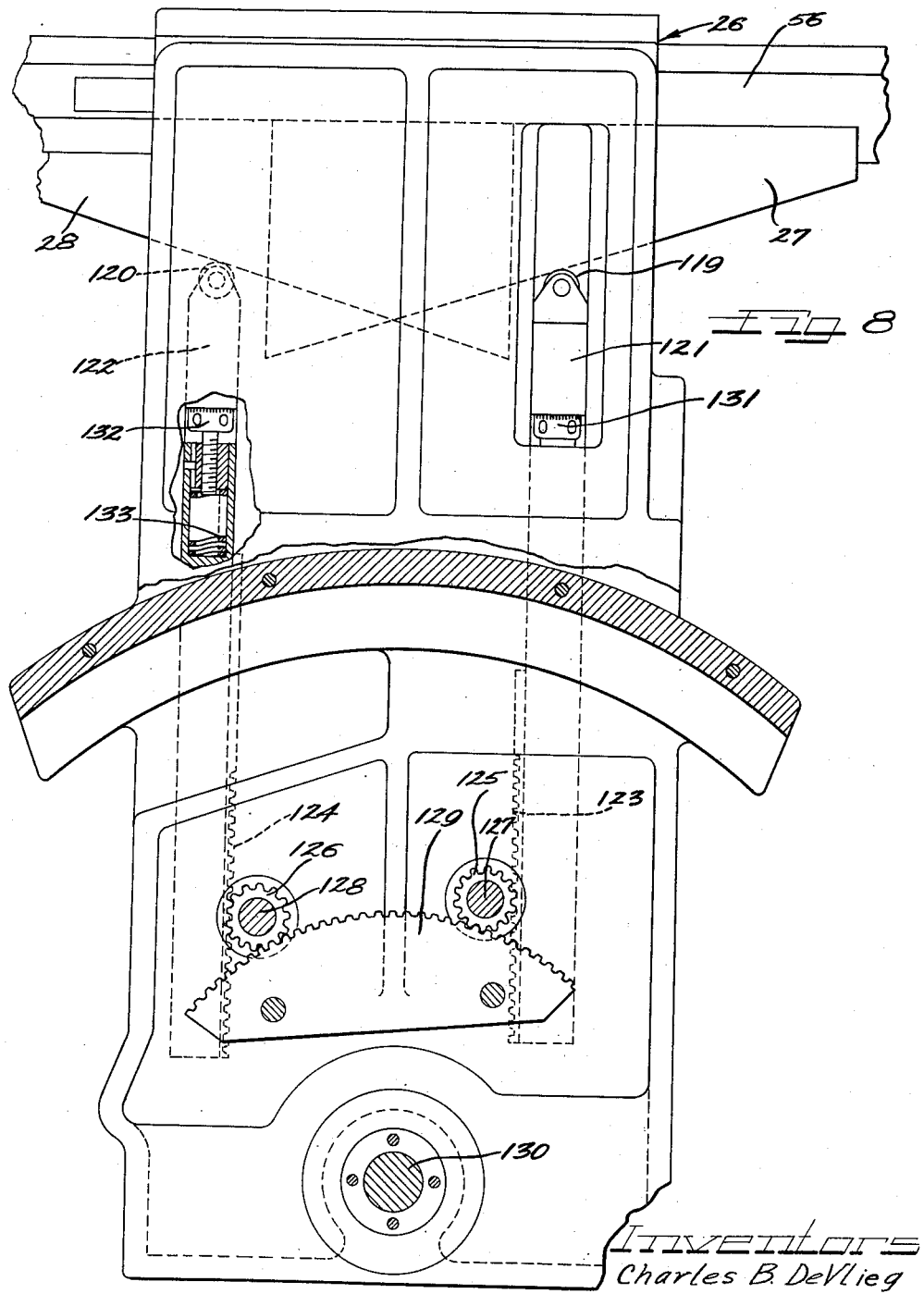
Figure 8 is an enlarged plan view, partly in section, illustrating the details of mechanism for effecting angular motion of the cutter head support table of the machine of Figure 1 about a vertical axis.

According to a further feature of this invention, a somewhat similar anti-backlash mechanism is employed to effect angular movement of the cutter head support table 24 about a vertical axis as a predetermined function of each of the other movements. As briefly described above, this mechanism includes the cams 27 and 28 which are carried by the rack 56 driven by the pinion gear 55. Riding the cams 27 and 28 (see Figures 3 and 8) and arranged to follow the surface thereof are followers in the form of rollers 119 and 120 journaled at the ends of spaced elongated bars 121 and 122, respectively. At the opposite ends of the bars 121 and 122 are racks 123 and 124, respectively. The bars 121 and 122 are arranged to slide in opposite parallel relation on suitable ways formed in the carriage 26. The racks 123 and 124 engage pinion gears 125 and 126, respectively, which are secured to vertically extending shafts 127 and 128 journaled on the carriage 26. The gears 125 and 126 mesh at spaced points with an arcuate gear segment 129 which may be rigidly secured to the underside of the table 24 by bolts or any suitable means. From the foregoing, it is seen that the angular movement of the cutter 21 about a vertical axis is controlled by the contour of the cams 27 and 28, the position of which at any instant is determined by the driving gear train.

It should be noted that the table 24 and the parts secured thereto are journaled for movement about a vertical axis on a vertical shaft 130 in the carriage 26.

The cams 27 and 28 and the bars 121 and 122 are so related that in effecting rotation of the gear segment 129, one of the bars moves bodily in one direction while the other bar moves bodily in the opposite direction. To adjust the position of the cam followers with respect to the cams, adjustment screws 131 and 132 are disposed between respective end portions of the bars 121 and 122 which in this instance are formed by two end-to-end parts.

Means are provided for preventing backlash when the angular movement of the cutter is changed from one direction to the other. In the present instance this is effected by a spring 133 associated with the adjustment screw 132 in the bar 122 in a manner such that it constantly urges the roller 120 into engagement with the cam 28 and the rack 124 into engagement with the pinion 126. Thus, no matter in which direction the cutter support table 24 is moved, positive engagement of the roller 120 with the cam 28, and positive engagement of the rack 124 with the pinion 126 insures that the table will be rotated without any lost motion.

It may be noted, at the same time, extreme pressures are not required between the parts due to the correlated nature of the cams 27 and 28.

It will be understood that modifications and variations may be effected without departing from the spirit and scope of the novel concepts of the present invention.

We claim as our invention:

1. In a metal working machine, a work head comprising a housing, a spindle mounted for rotational and axial movement and having an annular gear at one end, a lead screw for controlling the axial movement of said spindle, a shaft having a gear thereon and arranged to drive said lead screw, an anti-backlash nut disposed between said spindle and said lead screw for preventing relative axial movement between the spindle and the lead screw, and opposed pairs of gear trains disposed between said annular gear on the spindle and said gear on the shaft for effecting rotational motion of said spindle in a predetermined timed relation with the axial movement of the spindle.

2. In a metal working machine, a work head comprising a housing, a spindle mounted for rotational and axial movement and having an annular gear at one end, a lead screw for controlling the axial movement of said spindle, a shaft having a gear thereon and arranged to drive said lead screw, an anti-backlash nut disposed between said spindle and said lead screw for preventing relative axial movement between the spindle and the lead screw, and opposed pairs of gear trains each of which includes a rack gear, a cam associated with said rack gear so that the position of the cam is controlled by the rack gear, a follower engageable with said cam, and a second rack gear associated with said follower and disposed between said gear on the shaft and said annular gear on the spindle for effecting rotational motion of the latter.

3. In a metal working machine, a work head comprising a housing, a spindle mounted in said housing for axial and rotational movement and having elongated cut away portions on diametrically opposed sides, an anti-backlash nut in a concentric relation with said spindle and arranged to be threaded on a lead screw, said nut having elongated slots on diametrically opposed sides in alignment with said cut away portions in the spindle, means for holding said nut against axial movement relative to said lead screw and said spindle, and pins extending through said housing and said cut away portions of the spindle and fitting in said elongated slots formed on the nut so as to positively hold the nut against rotation while at the same time permitting axial movement of the spindle under control of the lead screw.

4. In a metal working machine, a work head comprising a housing, a spindle mounted for axial and rotational movement and having elongated cut away portions on diametrically opposite sides, an anti-backlash nut disposed on the interior of said spindle and arranged to be threadable on a lead screw, means on said spindle for holding said nut in relation to the lead screw and the spindle such that relative axial displacement between the spindle and the lead screw is avoided during reversal of movement of the latter, and means extending through said housing and said cut away portions on the spindle for holding the nut in a fixed relation with the housing while at the same time permitting rotational and axial movement of the spindle.

5. In a metal working machine, a housing, a spindle journaled in said housing for rotational and axial movements, a nut secured to said spindle against axial movements but relatively rotatable with respect to said spindle, means for securing said nut against rotational movements relative to said housing, a lead screw engaging said nut, means for securing said lead screw to said housing against axial movements but permitting rotational movements of said lead screw, means for rotating said lead screw to axially shift said spindle, and means geared to said lead screw for rotating said spindle in timed relation to its said axial movement.

6. In a metal working machine, a housing, a hollow spindle journaled in said housing for rotational and axial movement, said spindle having an axially and circumferentially extending aperture in the wall thereof, a nut inserted in the bore of said spindle adjacent said aperture, said nut being rotatable relative to said spindle, means for securing said nut to said spindle against relative axial movements, a stop member on said housing projecting through said aperture and engaging said nut to prevent rotational movements thereof but permitting axial movements, a lead screw engaging said nut, means for securing said lead screw to said housing against axial movements but permitting rotational movements of said lead screw, means for rotating said lead screw to axially shift said spindle, and means geared to said lead screw for rotating said spindle in timed relation to its said axial movement.

7. In a machine including reversible drive means, a support structure and a member rotatable in opposite directions relative to said support structure, mechanism for effecting rotation of said member according to predetermined functions of movement of said drive means, comprising: a pair of toothed members, gearing means between each of said toothed members and said member, first cam follower means between one of said toothed members and said drive means arranged to exert a force urging rotation of said member in one direction, and second cam and cam follower means between the other of said toothed members and said drive means arranged to exert a force urging rotation of said member in the reverse direction movement of said drive means in one direction being effective to increase the force exerted by said first cam and cam follower means and reduce the force exerted by said second cam and cam follower means to cause rotation of said member in one direction, and movement of said drive means in the reverse direction being effective to increase the force exerted by said second cam and cam follower means and reduce the force exerted by said first cam and cam follower means to cause rotation of said member in the reverse direction, whereby motion of said member is produced by the joint action of both cam and cam follower means without backlash and with the required drive forces being minimized.

8. In a metal working machine, a carriage, a cutter head rotatably mounted on said carriage, a first gear connected to said cutter head for rotation therewith, first and second rack gears, pinion gear means between each of said rack gears and said first gear, a slide supported for reciprocable rectilinear movement on said carriage, and first and second cam and cam follower means between said slide and said pair of rack gears, movement of said slide in one direction being effective to increase the force exerted by said first cam and cam follower means and reduce the force exerted by said second cam and cam follower means to cause rotation of said cutter head in one direction, and movement of said slide in the reverse direction being effective to increase the force exerted by said second cam and cam follower means and reduce the force exerted by said first cam and cam follower means, whereby motion of said cutter head is produced by the joint action of both cam and cam follower means without backlash and with the forces required to drive said slide being minimized.

References Cited in the file of this patent
UNITED STATES PATENTS

| | | |
|---|---|---|
| 1,876,353 | Sidgraves | Sept. 6, 1932 |
| 2,124,852 | Graves et al. | July 26, 1938 |
| 2,422,112 | Marsilius | June 10, 1947 |
| 2,600,591 | Wang | June 17, 1952 |